(12) United States Patent
Pfaffenberger et al.

(10) Patent No.: US 6,515,473 B2
(45) Date of Patent: Feb. 4, 2003

(54) PEDAL WITH INTEGRATED POSITION SENSOR

(75) Inventors: David S. Pfaffenberger, Mishawaka, IN (US); Robert L. Newman, Osceola, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 10/190,107

(22) Filed: Jul. 3, 2002

(65) Prior Publication Data

US 2002/0175676 A1 Nov. 28, 2002

Related U.S. Application Data

(63) Continuation of application No. 09/708,363, filed on Nov. 8, 2000, now Pat. No. 6,426,619, which is a continuation-in-part of application No. 09/208,296, filed on Dec. 9, 1998, now Pat. No. 6,211,668.

(51) Int. Cl.[7] .............................. G01B 7/14; G01R 33/06
(52) U.S. Cl. ..................................... 324/207.2; 74/512
(58) Field of Search ........................ 324/207.2, 207.25, 324/207.22, 207.24, 207.21, 173, 174; 338/32 M; 74/512, 513, 514, 560

(56) References Cited

U.S. PATENT DOCUMENTS

| | | | |
|---|---|---|---|
| 4,505,151 A | 3/1985 | Sauerschell | |
| 5,385,068 A | * | 1/1995 | White et al. .................. 74/512 |
| 5,416,295 A | 5/1995 | White | |
| 5,697,260 A | * | 12/1997 | Rixon et al. .................. 74/514 |
| 5,768,946 A | 6/1998 | Fromer | |
| 5,934,152 A | 8/1999 | Aschoff | |
| 6,070,490 A | 6/2000 | Aschoff | |
| 6,209,418 B1 | 4/2001 | Kalsi | |
| 6,220,222 B1 | 4/2001 | Kalsi | |
| 6,295,891 B1 | 10/2001 | Velte | |
| 6,305,240 B1 | 10/2001 | Hannewald | |
| 6,426,619 B1 | * | 7/2002 | Pfaffenberger et al. .. 324/207.2 |

FOREIGN PATENT DOCUMENTS

| | | |
|---|---|---|
| DE | 4407005 C1 | 3/1995 |
| EP | 0748713 A2 | 6/1996 |
| WO | WO01/14161 A1 | 3/2001 |
| WO | WO01/81110 A1 | 11/2001 |
| WO | WO01/85485 A1 | 11/2001 |

* cited by examiner

Primary Examiner—Edward Lefkowitz
Assistant Examiner—Subhash Zaveri
(74) Attorney, Agent, or Firm—Mark P. Bourgeois

(57) ABSTRACT

A pedal and sensor assembly for mounting to a vehicle. The assembly has a pedal arm having a first end and a second end. A magnetic field generator is connected to the second end to generate a variable magnetic field as the pedal moves. A housing is attached to the vehicle and has the second end and the magnetic field generator contained therein. A magnetic field sensor is located adjacent to the magnetic field generator and detects the variable magnetic field such that as the pedal arm rotates the magnetic field sensor generates an electrical signal proportional to the strength of the variable magnetic field and that is indicative of the position of the pedal arm.

12 Claims, 4 Drawing Sheets

PEDAL WITH INTEGRATED POSITION SENSOR

CROSS REFERENCE TO RELATED AND CO-PENDING APPLICATIONS

This application is a continuation of U.S. patent application Ser. No. 09/708,363 filed Nov. 8, 2000 now U.S. Pat. No. 6,426,619 entitled, "Pedal with Integrated Position Sensor", which is a continuation in part of U.S. patent application Ser. No. 09/208,296 filed Dec. 9, 1998 now U.S. Pat. No. 6,211,668 entitled, "Non Contacting Position Sensor using Bi-polar Tapered Magnets", and is herein incorporated by reference.

BACKGROUND OF THE INVENTION

I. Technical Field

This invention relates, in general, to pedals and pedal sensors . More particularly, this invention relates to a non-contacting position sensor utilizing Hall effect devices and variable flux fields.

II. Background Art

Electronic devices are an increasingly ubiquitous part of everyday life. Electronic devices and components are presently integrated in a large number of products, including products traditionally thought of as primarily mechanical in nature, such as automobiles. This trend is almost certain to continue. To successfully integrate electronic and mechanical components, some type of interface between the two technologies is required. Generally this interface is accomplished using devices such as sensors and actuators.

Position sensing is used to electronically monitor the position or movement of a mechanical component. The position sensor produces an electrical signal that varies as the position of the component in question varies. Electrical position sensors are an important part of innumerable products. For example, position sensors allow the status of various automotive parts to be monitored and controlled electronically. A position sensor must be accurate, in that it must give an appropriate electrical signal based upon the position measured. If inaccurate, a position sensor will hinder the proper evaluation and control of the position of the component being monitored. A position sensor must also be adequately precise in its measurement. The precision needed in measuring a position will obviously vary depending upon the particular circumstances of use. For some purposes only a rough indication of position is necessary, for instance, an indication of whether a valve is mostly open or mostly closed. In other applications more precise indication of position may be needed.

A position sensor must also be sufficiently durable for the environment in which it is placed. For example, a position sensor used on an automotive valve will experience almost constant movement while the automobile is in operation. Such a position sensor must be constructed of mechanical and electrical components which are assembled in such a manner as to allow it to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers to produce electrical signals that vary as a function of the component's position. Contacting position sensors are generally accurate and precise. Unfortunately, the wear due to contact during movement of contacting position sensors has limited their durability. Also, the friction resulting from the contact can result in the sensor affecting the operation of the component. Further, water intrusion into a potentiometric sensor can disable the sensor.

One important advancement in sensor technology has been the development of non-contacting position sensors. As a general proposition, a non-contacting position sensor ("NPS") does not require physical contact between the signal generator and the sensing element. As presented here, an NPS utilizes magnets to generate magnetic fields that vary as a function of position and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and move relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of the contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag upon the component by the sensor.

While the use of an NPS presents several advantages, there are also several disadvantages that must be overcome in order for an NPS to be a satisfactory position sensor for many applications. Magnetic irregularities or imperfections may compromise the precision and accuracy of an NPS. The accuracy and precision of an NPS may also be affected by the numerous mechanical vibrations and perturbations likely be to experienced by the sensor. Because there is no physical contact between the item to be monitored and the sensor, it is possible for them to be knocked out of alignment by such vibrations and perturbations. A misalignment will result in the measured magnetic field at any particular location not being what it would be in the original alignment. Because the measured magnetic field will be different than that when properly aligned the perceived position will be inaccurate. Linearity of magnetic field strength and the resulting signal is also a concern.

With the advent of drive by wire systems, also called electronic throttle control or ETC, a need has developed for accurate and cost effective position sensing of accelerator pedals in automotive applications. In particular, an unmet need exists for a non-contacting pedal sensor that has long life and is readily manufacturable.

SUMMARY OF THE INVENTION

A feature of the invention is to provide a non-contacting position sensor utilizing Hall effect devices and variable flux fields.

Another feature of the invention is to provide a pedal and sensor assembly for mounting to a vehicle. The pedal is depressed by a user. The assembly includes a pedal arm having a first end and a second end. The first end is depressed by the user. The pedal arm is rotatable about an axis. A magnetic field generator connected to the second end for generating a variable magnetic field. A housing is attached to the vehicle and has the second end and the magnetic field generator contained therein. The first end emanates from the housing. A magnetic field sensor is located adjacent to the magnetic field generator and detects the variable magnetic field such that as the pedal arm rotates the magnetic field sensor generates an electrical signal proportional to the strength of the variable magnetic field and is indicative of the position of the pedal arm.

It is noted that the drawings of the invention are not to scale. The drawings are intended to depict only typical embodiments of the invention, and therefore should not be considered as limiting the scope of the invention. The invention will be described with additional specificity and detail through the accompanying drawings.

DESCRIPTION OF THE PREFERRED EMBODIMENT

Figure 1:
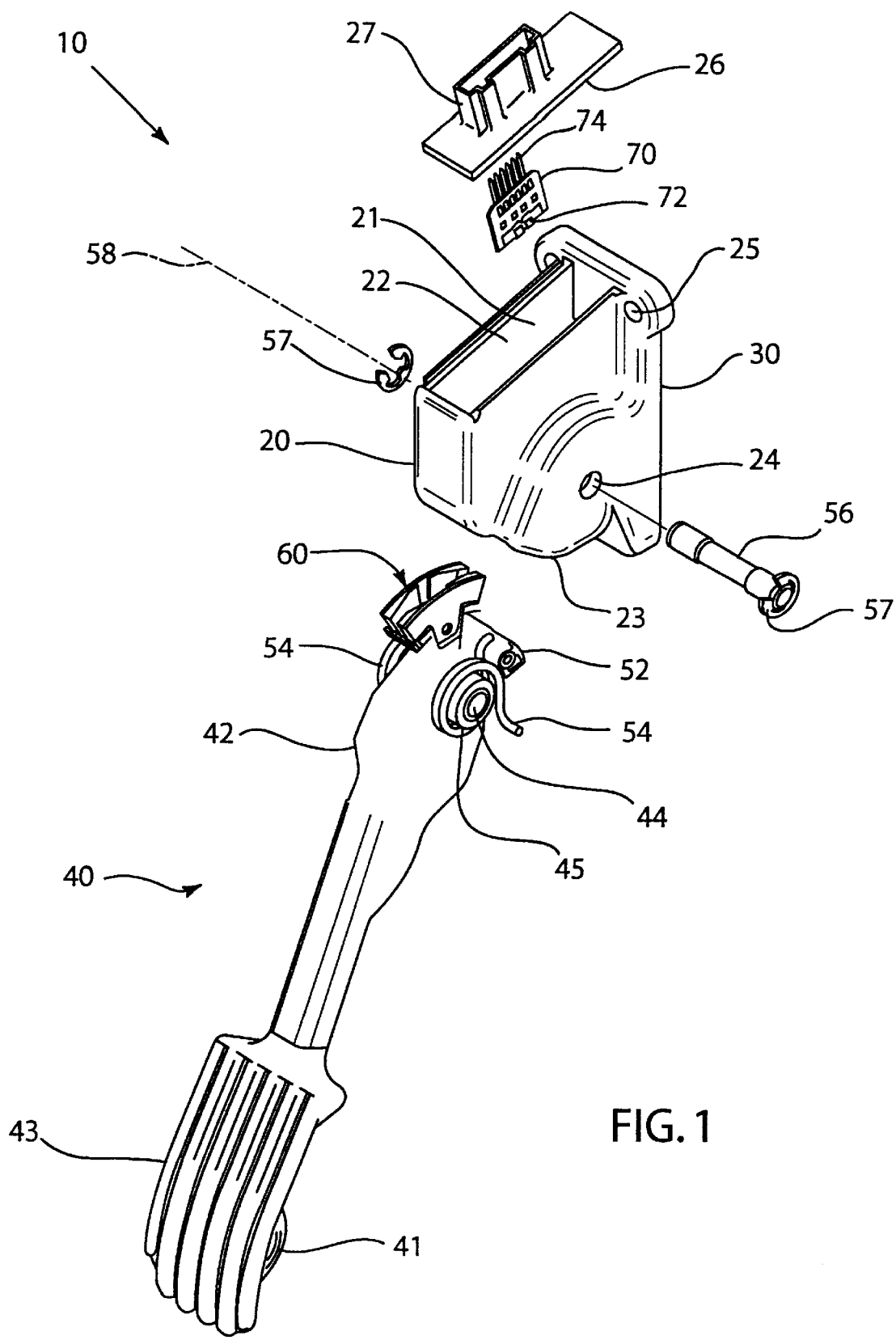
FIG. 1 illustrates an exploded perspective view of a pedal assembly in accordance with the preferred embodiment of the present invention.
Figure 2:
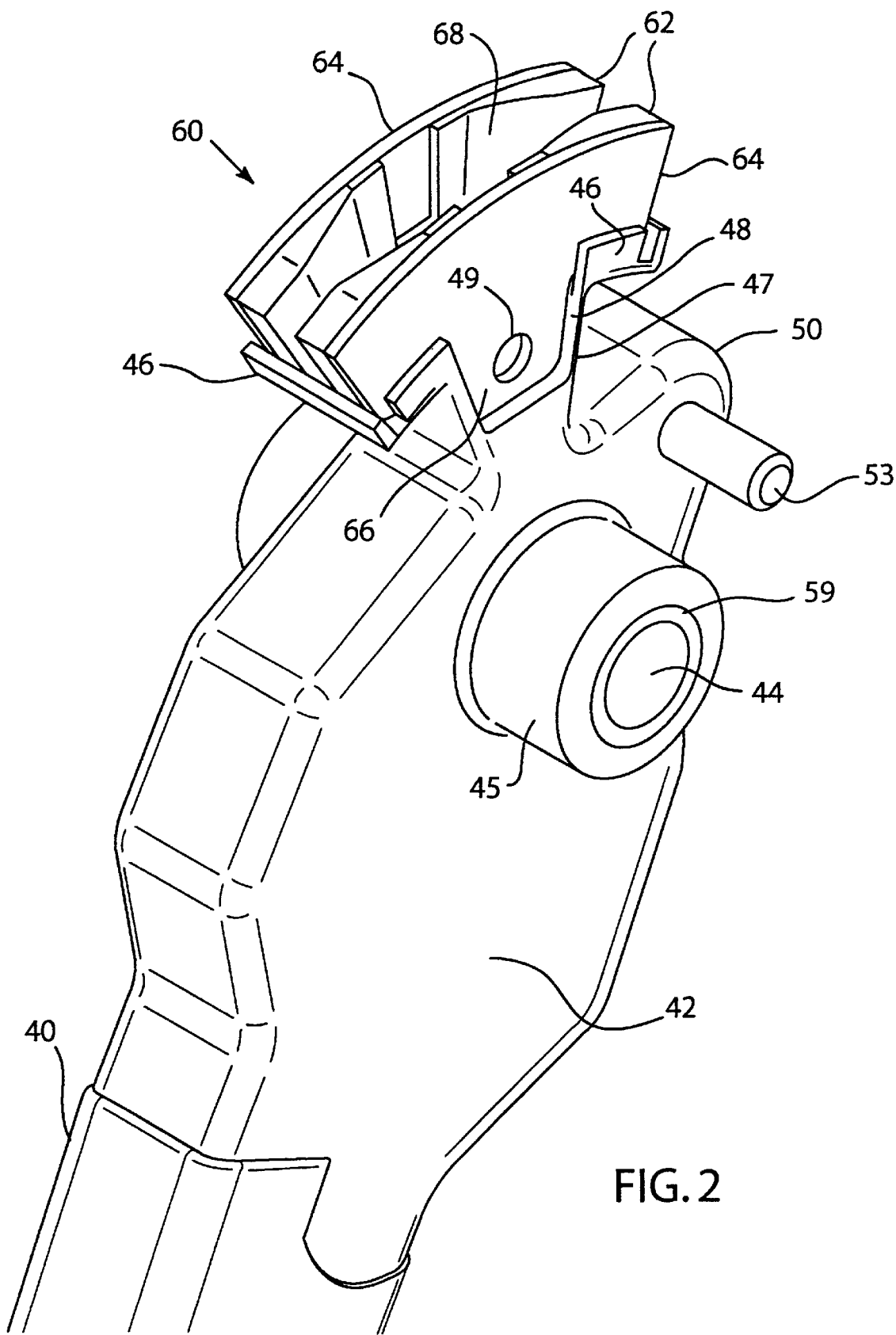
FIG. 2 illustrates an enlarged view of the magnet assembly from FIG. 1.
Figure 3:
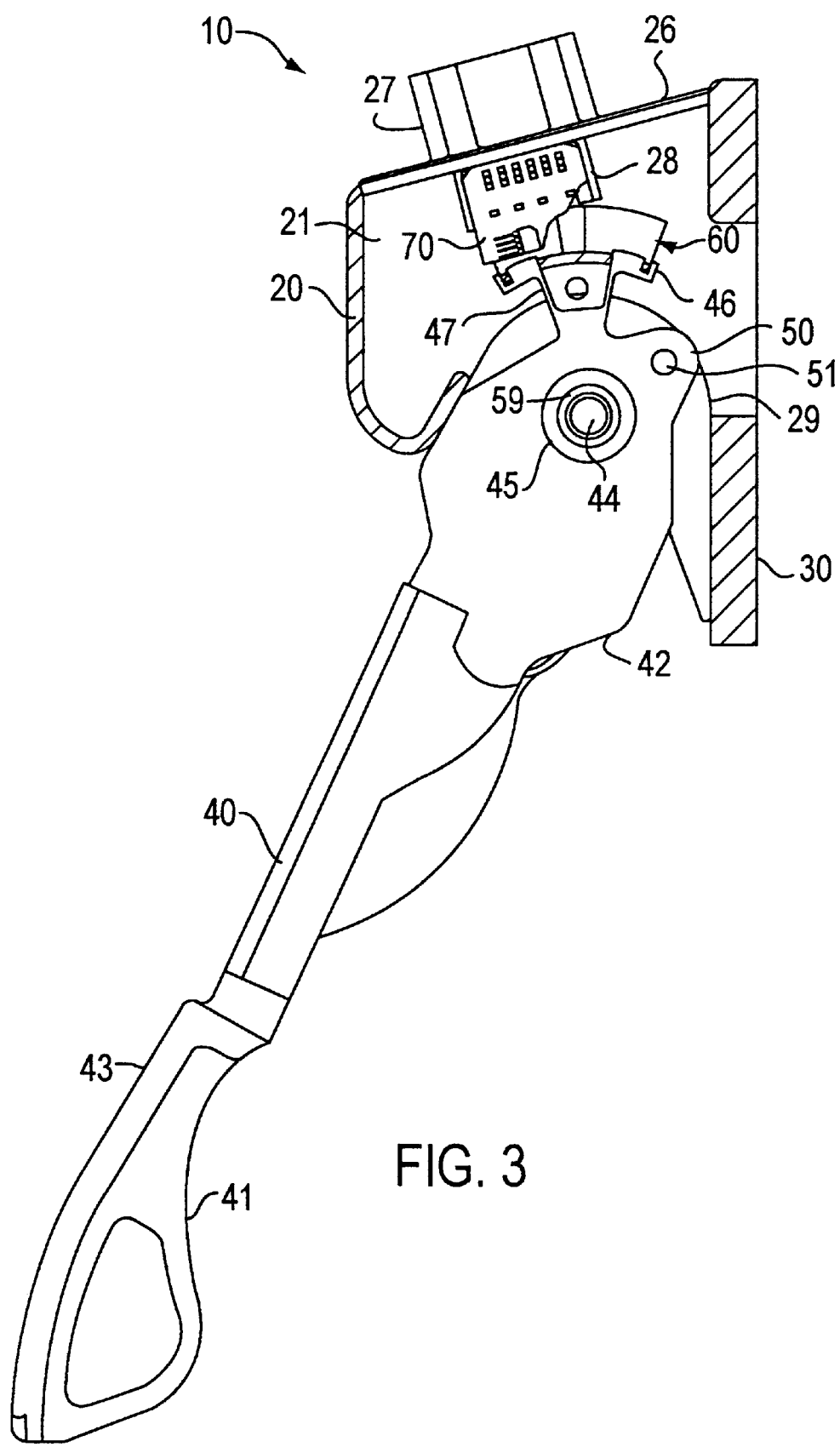
FIG. 3 illustrates a cross sectional side view of the pedal assembly in an assembled state.
Figure 4:
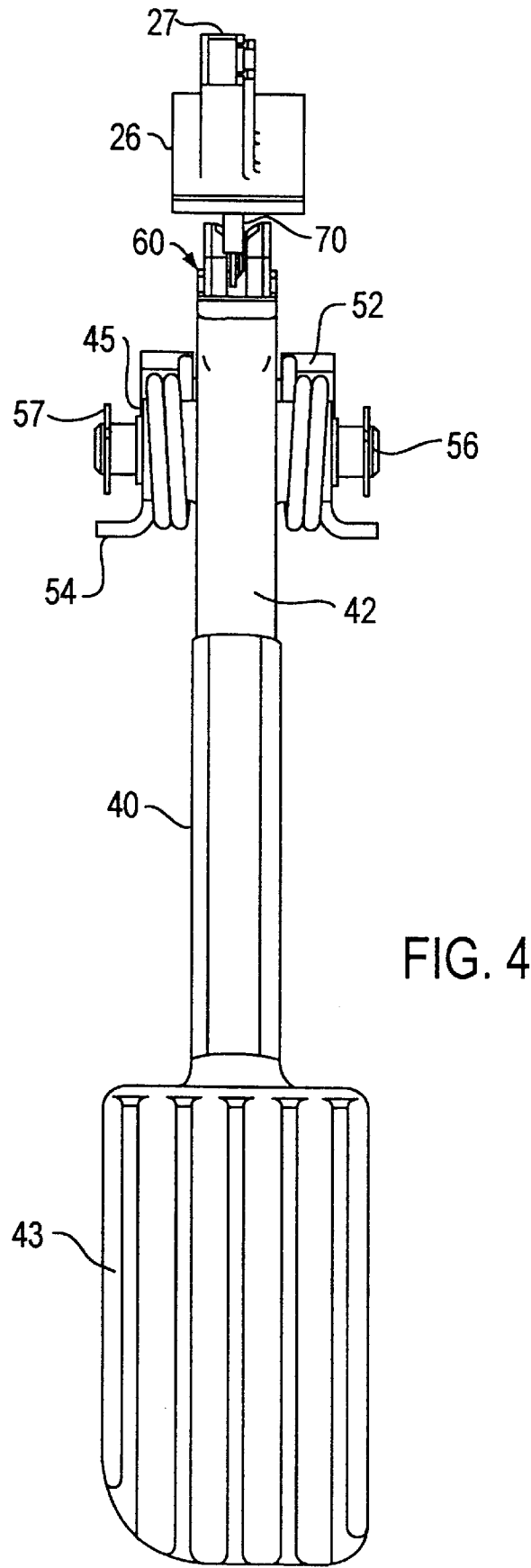
FIG. 4 illustrates an end view of the pedal assembly in an assembled state.

Referring to FIGS. 1, 2, 3 and 4, a Pedal Position Sensor Using Bipolar Tapered Magnets is shown. Pedal and sensor assembly 10 includes a housing 20. Housing 20 has a cavity 21, connector opening 22, pedal opening 23 and inner wall 29. A rod aperture 24 passes through housing 20. Several bulkhead mounting holes 25 are located on back wall 30. Back wall 30 is designed to be placed against a bulkhead in a vehicle and secured to the bulkhead with bolts (not shown) that pass through holes 25. A rectangular connector plate 26 is mounted over connector opening 22 and is ultrasonically welded or heat staked to housing 20. A connector shroud 27 extends outwardly from connector plate 26. A wire harness connector (not shown) mates with connector shroud 26 to provide an electrical connection from assembly 10 to an external electronic circuit such as a computer in the vehicle. Connector plate 26 also has a circuit board retainer 28 extending into cavity 21. Housing 20 is preferably formed from injection molded plastic.

An elongated pedal arm 40 has a first end 41 and a second end 42. A rubber foot rest 43 is attached or molded to first end 41. Pedal arm 40 is preferably formed out of injected molded plastic. Footrest 43 is depressed by the foot of a user during use in a vehicle. A pair of flanges 45 that extend outwardly on each side of second end 42. A bushing 59 passes through flanges 45 and end 42. A rod aperture 44 passes through flanges 45. Magnet projection 47 and friction plate projection 50 extend from second end 42. Magnet projection 47 has a recess 48 therein and a magnet mounting aperture 49 passing through. Projection 47 has a lip 46 extending upwardly to assisting in retention of the magnets. Alternatively, Friction plate projection 50 has a friction plate aperture 51 passing therethrough. A steel friction plate pin 53 is mounted into aperture 51 and extends on each side of end 42. Friction plates 52 slide over pin 53. The friction plates rub against wall 29 to provide a hysteresis feel. That is increasing resistance as the pedal is depressed and a reduction in force as the pedal returns. A pair of steel coil springs 54 are mounted over flanges 45. Springs 54 have one end that rests on friction plate 52 and another end that is held inside cavity 21. Spring 54 returns pedal arm 40 to a starting position when the pedal is not being depressed. A steel rod 56 passes through apertures 24 and 44 along axis of rotation 58, in order to retain the pedal arm 40 in housing 20. Snap rings 57 attach over ends of rod 56 to retain rod 56 in place.

Magnet assembly or magnetic field generator 60 includes a pair of magnetically permeable pole pieces 64 and a pair of tapered magnets 62.

The pole pieces 64 are bonded to magnets 62. The magnet and pole pieces have a projection 66 that fits within recess 66. Lip 46 extends upwardly from projection 47 and assists in retaining magnets 62. Each of the magnets and pole pieces 62 and 64 straddle the projection 47 and are held there by a fastener (not shown) that passes through aperture 49. Alternatively, the magnets may be integrally injection molded into the pedal arm eliminating the need for a fastener. An air gap 68 is formed by the magnets 62 being held apart. The pole pieces are preferably formed from sheets of magnetically permeable material such as stainless steel. The magnets typically are polymer ferrite magnets. Circuit board 70 mounts into circuit board retainer 28 and has one or more magnetic field sensors such as a hall effect device 72 mounted thereon. Terminals 74 are connected to circuit board 70 and extend into shroud 27. The hall effect device 72 is mounted in the air gap 68. The description and operation of magnetic field generator 60 is described in detail in U.S. patent application Ser. No. 09/208,296 filed Dec. 09, 1998 entitled, "Non Contacting Position Sensor using Bi-polar Tapered Magnets", which is incorporated by reference in entirety.

Pedal and sensor assembly 10 detects rotary motion of the pedal as it is depressed by the foot of a user. The Hall effect device 72 and circuit board 70 are stationary while the magnets 62 rotate about axis 58. The circuit board may be attached to the retainer 28 using heat staking or similar methods. The circuit board 70 also carries electronic circuitry for processing signals from the hall effect devices. The hall effect device 72 is electrically connected to the terminals 74. The electrical terminals 74 are designed for interconnection with a standard mating connector. As the magnetic field generated by the magnetic field generator 60 varies with rotation about axis 58, the signal produced by the Hall effect device 72 changes linearly, allowing the position of the pedal to be monitored to be ascertained. In other words, the magnetic field sensor detects the variable magnetic field such that as the pedal arm rotates the magnetic field sensor generates an electrical signal proportional to the strength of the variable magnetic field that is indicative of the position of the pedal arm.

Pedal and sensor assembly 10 is assembled in the following manner. Tube 59 and pin 53 are pressed into their respective apertures in second end 42. Each half of magnet 62 and pole piece 64 are place on opposite sides of magnet projection 47 with projection 66 fitting into recess 48. Fasteners (not shown) pass through magnet aperture 49 to retain the magnets and pole pieces. Next, the friction plates 52 are slid over pin 53 and springs 54 are placed over flanges 45. The pedal arm 40 is next slid into pedal opening 23 and rod 56 is slid through apertures 24 and 44 to retain the pedal arm to the housing. Snap rings 57 are attached to rod 56 to retain rod 56. Circuit board 70 is slid into circuit board retainer 28. Circuit board retainer 28 has tabs (not shown) that hold the circuit board 70. Connector plate 26 is placed over connector opening 22 and ultrasonically welded or heat staked to housing 20 completing the assembly. Alternatively, the magnets may be integrally injection molded into the pedal arm eliminating the need for a fastener. One skilled in the art will likewise readily ascertain other variations that may easily be made without departing from the spirit and scope of the present invention.

What is claimed is:

1. A pedal and sensor assembly for mounting to a vehicle, the pedal being depressed by a user, comprising:
   a) a pedal arm having a first end, a second end and an aperture;
   b) a rod extending through the aperture;
   c) a magnetic field generator connected to the second end for generating a magnetic field;
   d) a housing, attachable to the vehicle and rotatably supporting the rod; and
   e) a magnetic field sensor disposed adjacent the magnetic field generator for detecting the magnetic field.

2. The pedal and sensor assembly according to claim 1 wherein the magnetic field generator is a permanent magnet.

3. The pedal and sensor assembly according to claim 2, wherein the magnet is tapered.

4. The pedal and sensor assembly according to claim 3, wherein the magnetic field sensor is a hall effect device.

5. The pedal and sensor assembly according to claim 4, wherein the second end has a friction plate attached for engagement with a wall of the housing to provide a resistive feedback to the user.

6. The pedal and sensor assembly according to claim 5, wherein the second end has a pair of flanges on each side of the second end, the flanges each having a coil spring mounted thereon.

7. A pedal and sensor assembly for mounting to a vehicle, the pedal being depressed by a user, comprising:
   a) a pedal arm having a first end, a second end and a pair of flanges extending outwardly from the pedal arm, the first end adapted to be depressed by the user;
   b) a housing, attachable to the vehicle, the housing rotatably supporting the pedal through the flanges;
   c) a magnetic field generator attached to the second end of the pedal arm for generating a magnetic field, the magnetic field generator moving as the second end moves; and
   d) a magnetic field sensor mounted to the housing, adjacent the magnetic field generator for detecting the magnetic field such that as the pedal arm rotates the magnetic field sensor generates an electrical signal proportional to the strength of the magnetic field and indicative of the position of the pedal arm.

8. The pedal and sensor assembly according to claim 7 wherein the magnetic field generator is a permanent magnet.

9. The pedal and sensor assembly according to claim 8, wherein the magnet generates a variable magnetic field.

10. The pedal and sensor assembly according to claim 7, wherein the magnetic field sensor is a hall effect device.

11. The pedal and sensor assembly according to claim 7, wherein the housing has an aperture extending through the housing, a rod mounted through the aperture and the flanges.

12. The pedal and sensor assembly according to claim 7, wherein the flanges each having a coil spring mounted thereon.

* * * * *